United States Patent
Kim

(10) Patent No.: US 10,969,041 B2
(45) Date of Patent: Apr. 6, 2021

(54) CONNECTOR FOR PNEUMATIC CIRCUIT

(71) Applicants: Hyundai Motor Company, Seoul (KR); Kia Motors Corporation, Seoul (KR)

(72) Inventor: Dae Su Kim, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 223 days.

(21) Appl. No.: 16/197,695

(22) Filed: Nov. 21, 2018

(65) Prior Publication Data

US 2020/0103061 A1    Apr. 2, 2020

(30) Foreign Application Priority Data

Oct. 1, 2018  (KR) .......................... 10-2018-0116927

(51) Int. Cl.
  *F16L 21/00*    (2006.01)
(52) U.S. Cl.
  CPC ........... *F16L 21/00* (2013.01); *F16L 2201/10* (2013.01); *F16L 2201/30* (2013.01)
(58) Field of Classification Search
  CPC .......................... F16L 2201/10; F16L 2201/30
  USPC .................................................... 285/93, 13
  See application file for complete search history.

(56) References Cited

U.S. PATENT DOCUMENTS

| | | | | |
|---|---|---|---|---|
| 4,067,329 A | * | 1/1978 | Winicki ............ | A61M 16/0051 285/93 |
| 6,027,143 A | * | 2/2000 | Berg ...................... | F16L 37/088 285/93 |
| 6,095,570 A | * | 8/2000 | Hagen ................... | F16L 37/084 285/93 |
| 2004/0090066 A1 | * | 5/2004 | Hoffmann ............. | F16L 37/088 285/305 |
| 2007/0284875 A1 | * | 12/2007 | Salomon-Bahls ......................... | F16L 37/0925 285/148.19 |
| 2010/0308572 A1 | * | 12/2010 | Pedersen ............. | F16L 37/0925 285/104 |
| 2011/0025045 A1 | * | 2/2011 | Preimesberger ........ | F16L 33/30 285/93 |
| 2019/0331273 A1 | * | 10/2019 | Vos ......................... | F16L 37/02 |

FOREIGN PATENT DOCUMENTS

DE           19523830 A1 *  1/1997  ............ F16L 37/088

* cited by examiner

*Primary Examiner* — David Bochna
(74) *Attorney, Agent, or Firm* — Mintz Levin Cohn Ferris Glovsky and Popeo, P.C.; Peter F. Corless

(57) ABSTRACT

A connector for a pneumatic circuit is provided. The connector includes a connector body in which an end portion of a tube is inserted and a sealing member disposed inside the connector body and maintaining sealing between the end portion of the tube and the connector body. An air vent aperture is formed through the connector body from an inner surface of the connector body to an outer surface of the connector body. When air that leaks from a gap between the connector body and the end portion of the tube inserted into the connector body flows into the air vent aperture and passes through the aperture, an edge tone alarm sound is generated.

10 Claims, 8 Drawing Sheets

CONNECTOR FOR PNEUMATIC CIRCUIT

CROSS-REFERENCE TO RELATED APPLICATION(S)

The present application claims priority to Korean Patent Application No. 10-2018-0116927, filed Oct. 1, 2018, the entire contents of which is incorporated herein for all purposes by this reference.

BACKGROUND

Field of the Invention

The present invention relates generally to a connector for a pneumatic circuit and, more particularly, to a connector for a pneumatic circuit that recognizes a situation in which a tube inside the connector does not compress an O-ring but slightly escapes from a compression place causing air leakage.

Description of the Related Art

Generally, vehicles are equipped with pneumatic circuits and pneumatic systems of various configurations using air pressure. In particular, commercial vehicles such as trucks are equipped with more pneumatic circuits and pneumatic systems than average-sized vehicles. In trucks, additional devices that are not used in the average-sized vehicles such as an air pressure brake system, a chassis air suspension, a cab air suspension, and a seat suspension are installed in the trucks, and pneumatic circuits are installed in a complex manner in these devices.

In addition, the pneumatic circuits of vehicles include connection parts for connecting hoses and tubes to each other or connecting the hoses and tubes to other parts as well as pipe parts such as the hoses and the tubes forming air passages. Particularly, as the connection parts applied to the pneumatic circuits, a connector is configured by assembling a guide, an O-ring, and a clamp inside a connector body. Hereinafter, the connector will be described with reference to the accompanying drawings.

FIG. 1 is a sectional view showing a conventional connector for the pneumatic circuit, FIG. 2 is a sectional view showing a situation in which a tube is assembled into the conventional connector for the pneumatic circuit, and FIG. 3 is a view showing an example in which the tube is inaccurately assembled into the connector for the pneumatic circuit of the related art. The tube 1 forms an air passage in the pneumatic circuit and is assembled into the connector 100 to provide connection between the tube and another tube or between the tube and another part using the connector 100.

Particularly, to provide the connection, the connector 100 includes a connector body 110 in which an end portion of the tube 1, a guide 120 disposed inside the connector body 110 and guiding the end portion of the tube to be inserted, a clamp 130 fixing the end portion of the tube inserted along the guide 120, and a sealing member 140 for maintaining sealing between the tube 1 fixed by the clamp 130 and an inner circumferential surface of the connector body 110. In addition, an O-ring made of a rubber material may be used as the sealing member 140 used with the tube 1 made of a plastic material. When the end portion of the tube 1 is inserted into the connector body 110 along the guide 120, the O-ring 140 is compressed by the inserted tube 1, the compressed O-ring 140 maintains a sealed state between the tube 1 and the connector body 110 while being interposed between an outer circumferential of the tube 1 and the inner circumferential surface of the connector body 110.

When the tube 1 is assembled into the connector 100, the tube 1 is inserted into an inside of the connector body 110 and is guided along an outer circumferential surface of the guide 120. Thereafter, the tube 1 passes through a hook 131 of the clamp 130 and is completely inserted into a position between the O-ring and the outer circumferential surface of the guide to compress O-ring 140. In addition, after the tube 1 is completely inserted into the connector body, the tube is reversely pulled to be locked by the hook 131 of the clamp 130. Thus, the tube 1 is fixed by the clamp 130 and is not separated from the connector body 110. In particular, the O-ring 140 maintains a sealed state while being compressed between the outer circumferential surface of the tube 1 and the inner circumferential surface of the connector body 110.

In FIG. 2, a left drawing shows a state before the tube 1 is inserted into the connector body 110, and a right drawing shows a state in which the tube is inserted into the connector body 100 and assembly of the tube and the connector is completed. However, in conventional connector, when an operator does not completely insert the tube 1 into the connector body 110 during assembly, the tube is unable to enter between the guide 120 and the O-ring 140 as shown in FIG. 3, thereby failing to compress the O-ring.

As a result, although the O-ring should maintain sealing between the connector body 110 and the tube 1 in a compressed state, air leakage in which air leaks may occur due to the fact that the O-ring is not compressed by the tube. However, in commercial vehicles such as trucks, a plurality of connectors is used in the pneumatic circuits such as break systems and suspensions, and the connectors are used in various locations. Therefore, as shown in FIG. 3, the connector may be difficult to find when the tube is not in a desired compression location where the tube may efficiently compress the O-ring, and thus an increased amount of time and effort are required to find the connector where the leakage occurs.

SUMMARY

Accordingly, the present invention provides a connector for a pneumatic circuit capable of more easily recognizing a state in which a tube inside the connector does not compress an O-ring but is slightly out of a compression location thus causing air leakage.

According to an exemplary embodiment of the present invention, a connector for a pneumatic circuit may include: a connector body in which an end portion of a tube is inserted; a sealing member disposed inside the connector body and maintaining sealing between the end portion of the tube and the connector body; and an air vent aperture formed through the connector body from an inner surface of the connector body to an outer surface of the connector body, and when air that leaks from a gap between the connector body and the end portion of the tube inserted into the connector body flows into the air vent aperture and passes through the aperture, an edge tone alarm sound is generated.

In the exemplary embodiment, the air vent aperture may be formed between an inner circumferential surface defining a tube insert space that is an inside space of the connector body into which the end portion of the tube is inserted, the inner circumferential surface forming the inner surface of the connector body, and an end surface of an end portion of the connector body, the end surface forming the outer surface of the connector body. In addition, the connector may further include: a clamp installed by being inserted into the connector body and fixing the end portion of the tube inserted into the connector body, the clamp may have a flange part at an end portion thereof, the flange part extending radially outward and being disposed outside the connector body, and a surface of the flange part may face the end surface of the end portion of the connector body.

The air vent aperture formed in the connector body may be configured as a plurality of air vent apertures arranged at regular intervals along a circumferential direction of the connector body. In addition, the plurality of air vent apertures may include respective inlets and outlets, the inlets may be arranged on the inner surface of the connector body at regular intervals along the circumferential direction of the connector body, and the outlets may be arranged on the outer surface of the connector body at regular intervals along the circumferential direction of the connector.

The plurality of air vent apertures may be configured so that at least some sections of each of the plurality of air vent apertures from the inner surface of the connector body pass through the connector body in an inclined direction, thus forming an edge portion on the connector body at a location close to an inlet of the air vent aperture. Therefore, in the connector for the pneumatic circuit according to the present invention, when the tube and the connector are incorrectly assembled or at least one of the tube and the connector has deterioration, the air leaked through a gap inside the connector generates an alarm sound such as a whistling sound while the air passes through the air vent aperture. Thus, an operator may locate the connector that generates the alarm sound more easily and rapidly among connectors inside a vehicle and repair the connector.

When using the connector for the pneumatic circuit according to the present invention, there are provided advantages in that inaccurate assembly of the tube and the connector may be prevented, and maintenance time may be shortened.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings so that the invention may be easily embodied by one of ordinarily skilled in the art to which the present invention belongs. Various changes to the following embodiments are possible and the scope of the present invention is not limited to the following embodiments.

Unless the context clearly indicates otherwise, it will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Figure 1:
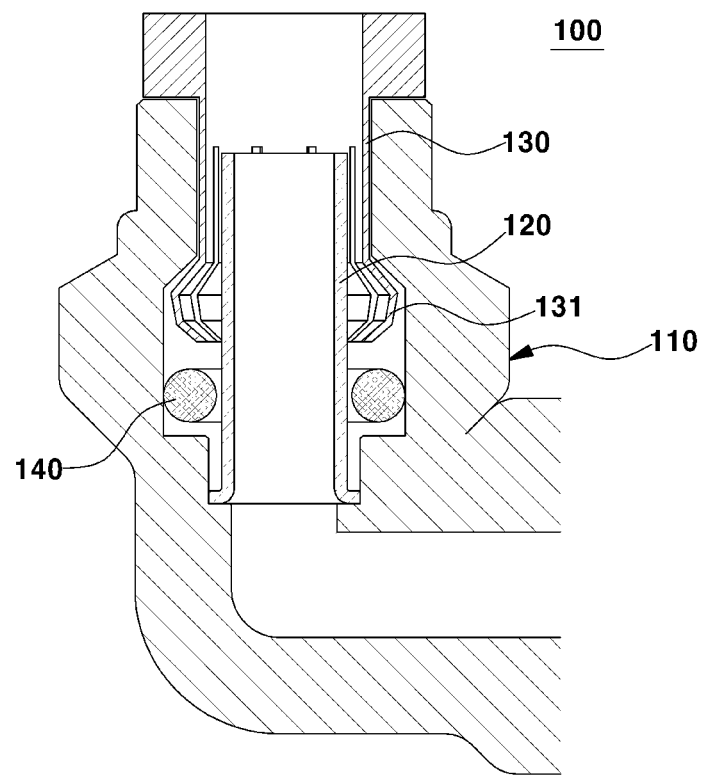
FIG. 1 is a sectional view showing a conventional connector for a pneumatic circuit according to the related art.
Figure 2:
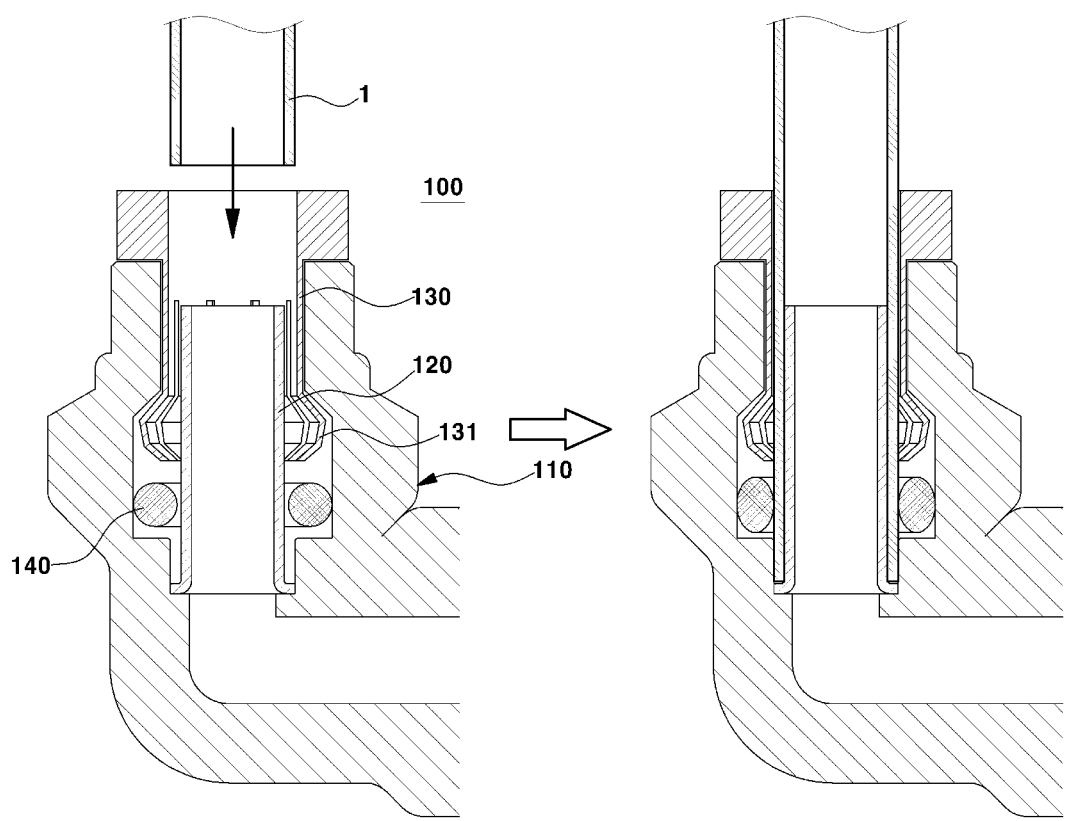
FIG. 2 is a sectional view showing the conventional connector for the pneumatic circuit into which a tube is assembled according to the related art.
Figure 3:
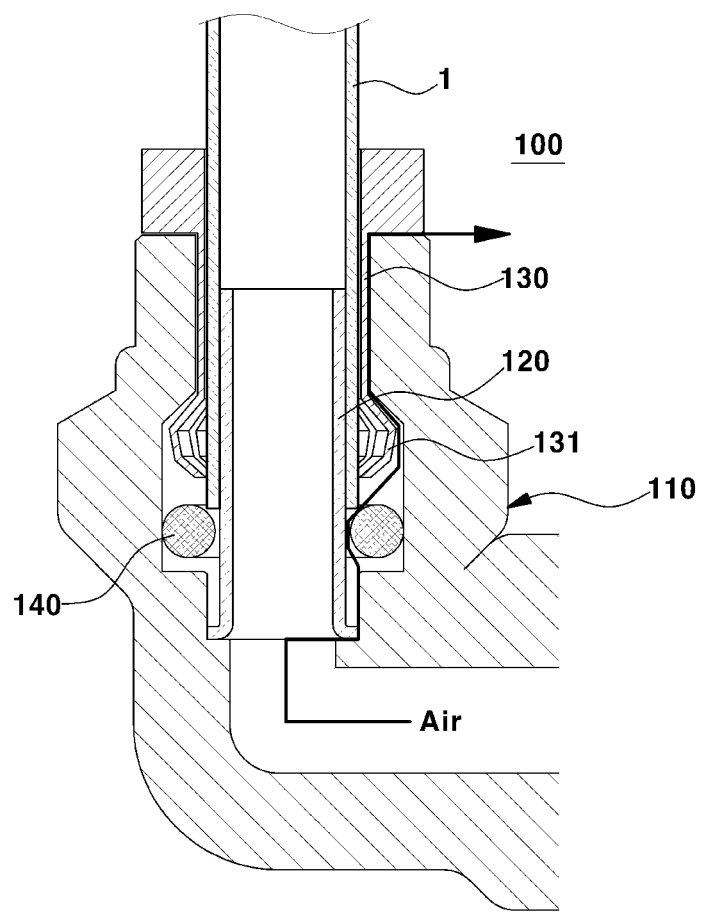
FIG. 3 is a view showing an example in which the tube is incorrectly assembled into the conventional connector according to the related art.
Figure 4:
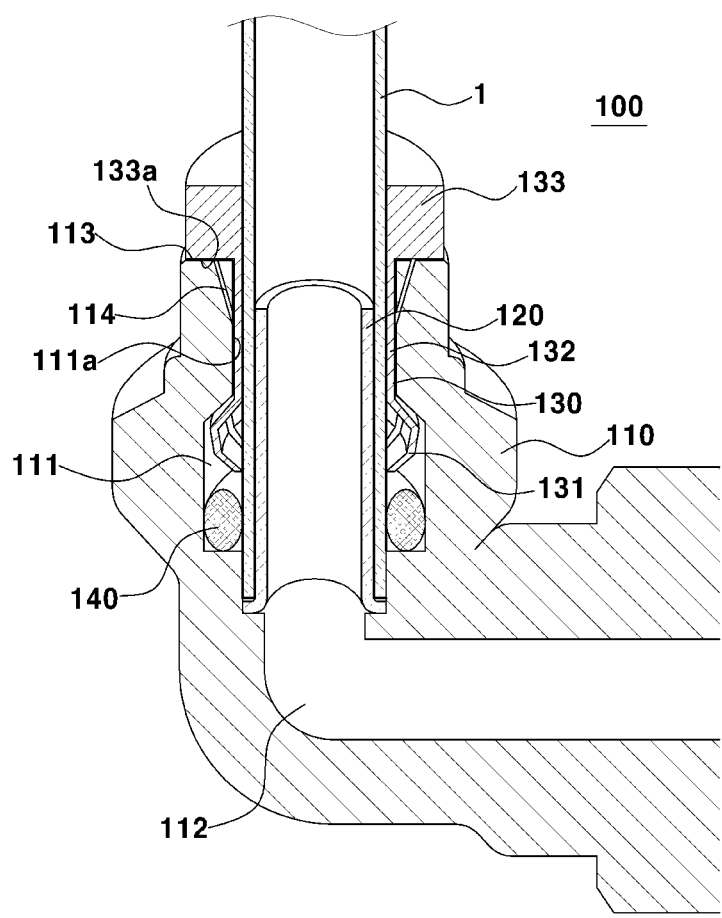
FIG. 4 is a sectional perspective view showing a structure of a connector for a pneumatic circuit according to an exemplary embodiment of the present invention.
Figure 5:
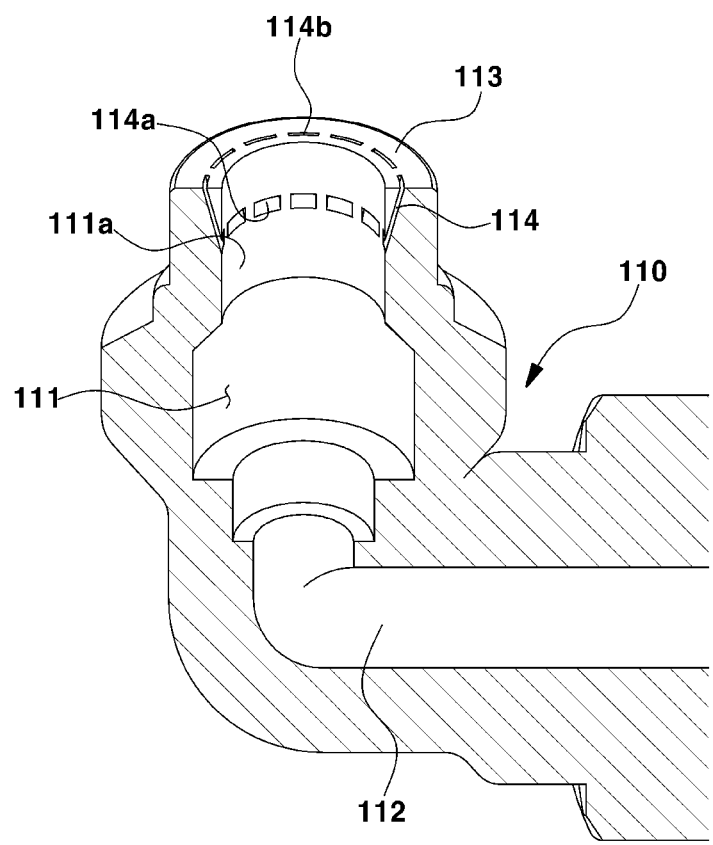
FIG. 5 is a sectional perspective view showing a connector body of the connector for the pneumatic circuit according to the exemplary embodiment of the present invention.
Figure 6:
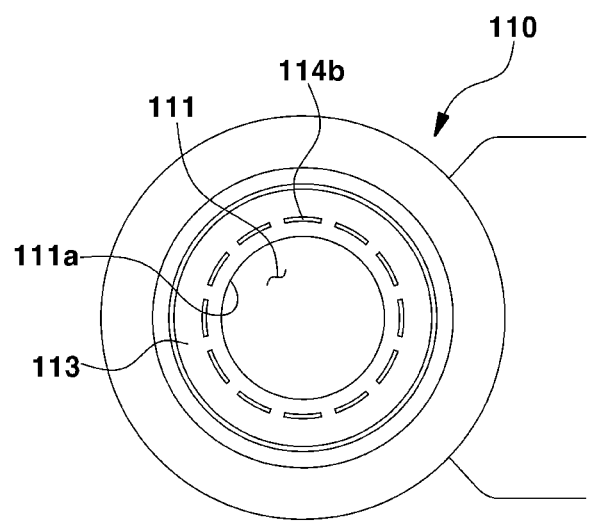
FIG. 6 is a view showing an outlet of an air vent aperture formed on an end portion of the connector body of the connector for the pneumatic circuit according to the exemplary embodiment of the present invention.
Figure 8:
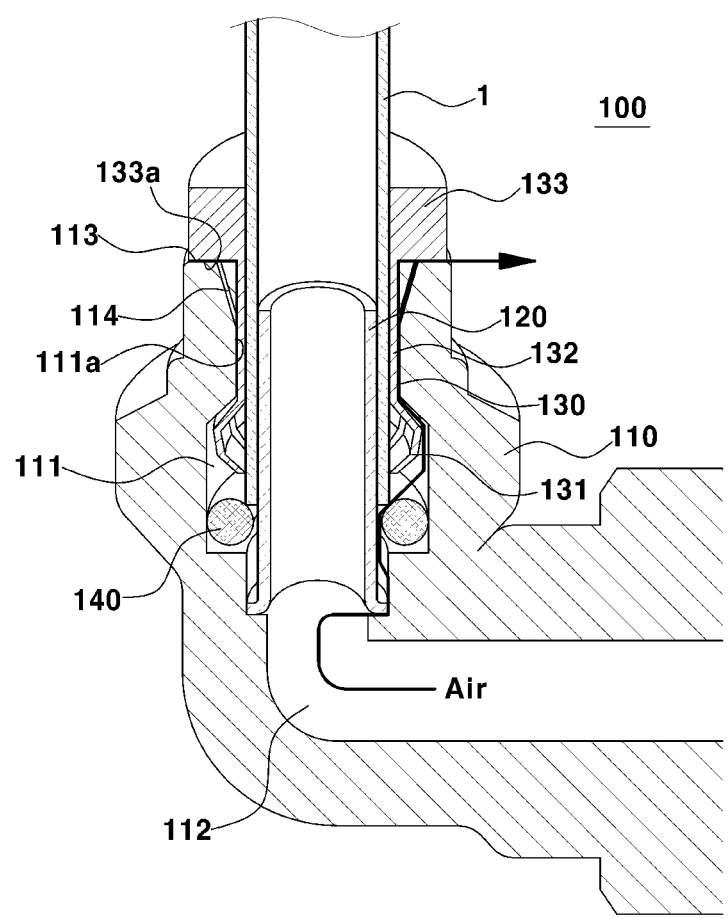
FIG. 8 is a sectional perspective view showing an air path when a tube is incorrectly assembled in the connector for the pneumatic circuit according to the exemplary embodiment of the present invention.

FIG. 4 is a sectional perspective view showing a structure of a connector 100 for a pneumatic circuit according to an exemplary embodiment of the present invention, and FIG. 5 is a sectional perspective view showing a connector body 110 of the connector 100 for the pneumatic circuit 100 according to the present invention. FIG. 6 is a view showing an outlet 114b of an air vent aperture formed on an end surface of an end portion 113 of the connector body 110 of the connector 100 for the pneumatic circuit 100 according to the exemplary embodiment of the present invention, and FIG. 8 is an enlarged sectional view showing the air vent aperture 114 of the connector body 110 of the connector 100 for the pneumatic circuit 100 according to the exemplary embodiment of the present invention.

FIG. 4 shows a status in which a tube 1 is correctly assembled in a desired assembly location, and FIG. 5 shows only the connector body 110 of the components of the connector 100 and shows the air vent aperture 114 formed through the connector body 110 from an inner surface of the connector body to an outer surface thereof.

First, as shown in FIG. 4, an end portion of the tube 1 is may be into the connector 100 according to the exemplary embodiment. When the end portion of the tube 1 is assembled by being inserted into a first end portion of the connector 100, a second end portion of the connector 100 (not shown) may be assembled with another tube or component (not shown). Thus, the connection between the tube 1 and the other tube or between the tube 1 and the other component may be possible through the connector 100.

When considering the configuration, the connector 100 for the pneumatic circuit 100 according to the exemplary embodiment of the present invention is not different from a conventional connector in that a guide 120, a clamp 130, and an O-ring 140 are assembled in the connector body 110. In other words, the connector 100 for the pneumatic circuit 100 according to the exemplary embodiment of the present invention may include: the connector body 110 in which the end portion of the tube 1 is inserted for connecting; the guide 120 disposed inside the connector body 110 and guiding the end portion of the tube 1 inserted into the connector body 110; the clamp 130 that fixes the end portion of the tube 1 inserted into the connector body 110; and a sealing member 140 disposed inside the connector body 110 and maintaining sealing between the end portion of the tube 1 and an inner circumferential surface of the connector body 110.

In the configuration, the tube 1 may be assembled to the first end portion of the connector body 110, and another tube or component may be assembled to the second end portion of the connector body 110, and thus an internal passage 112 inside the connector body 110 forms an air passage through which air may flow between the tube 1 and the other tube (e.g., a first tube 1 and a second tube) or between the tube 1 and the component, which are connected to both ends of the connector body. In addition, for assembly between the tube 1 and the connector 100, a tube insertion part 111 may be disposed in the first end portion of the connector body 110 to form a space where the end portion of the tube 1 may be inserted into the connector, the tube insertion part 111 is a part of an internal space of the connector body 110, and may include a space in which the guide 120, the clamp 130, and the O-ring 140 are seated.

Particularly, the tube insertion part 111 of the connector body 110 may form a passage having a circular section into which the tube 1, the guide 120, the clamp 130, and the O-ring 140 may be inserted. The guide 120 may be assembled by being inserted into the tube insertion part 111. Further, the guide 120 may be provided as a tubular shape such as a shape of a circular tube, and the sealing member 140 may be disposed outside the guide 120 in the tube insertion part 111 before the tube 1 is assembled into the tube insertion part.

When the tube 1 is a tube having a circular section made of a plastic material, the sealing member 140 may be an O-ring made of a rubber material. In addition, the clamp 130 having a tubular shape may be disposed outside the guide 120 before the tube 1 is assembled in the tube insertion part 111. The clamp 130 is configured by being integrally formed with a tubular part 132, a hook 131, and a flange part 133, and since the tubular part 132 may be inserted into the tube insertion part 111 of the connector body 110, the clamp 130 may be installed in the tube insertion part 111.

In addition, when the tubular part 132 is in an inserted state in the tube insertion part 111, the outer circumferential surface of the tubular part 132 may abut the inner circumferential surface 111a of the tube insertion part of the connector body 110. When the tube 1 is in an assembled state in the tubular part, the inner circumferential surface of the tubular part may abut the outer circumferential surface of the tube 1.

In the clamp 130, the hook 131 may be formed integrally at a first end portion of the tubular part 132, and may fix the tube 1 inserted into the tube insertion part 111. The flange part 133 may be formed integrally at a second end portion of the tubular part 132, disposed outside the connector body 110, and may extend radially outward from an end portion of the clamp 130. Thus, when the hook 131 and the tubular part 132 of the clamp 130 are inserted into an inside of the tube insertion part 111 of the connector body 110, a surface 133a of the flange part 133 may be disposed to face an end surface 113 of the end portion of the connector body 110.

In the above configuration, when the end portion of the tube 1 assembled into the connector 100 is pushed into the tube insertion part 111 of the connector body 110, the end portion of the tube 1 may be guided along the guide 120. In particular, the end portion of the tube 1 may pass between the outer circumferential surface of the guide 120 and the inner circumferential surface of the tubular part 132 of the clamp 130. Additionally, during assembling of the tube, when the end portion of the tube 1 is completely pushed into the tube insertion part 111, the end portion of the tube 1 may pass between the outer circumferential surface of the guide 120 and the hook 133 of the clamp 130 and may pass between the outer circumferential surface of the guide 120 and the O-ring 140.

As above described, when the end portion of the tube 1 is completely inserted into the inside of the connector body 140 along the guide 120, the O-ring 140 may be compressed by the inserted tube 1, whereby the compressed O-ring 140 maintains sealing between the tube 1 and the connector body 110 in a state of being interposed between the inner circumferential surface of the connector body 110 and the outer circumferential surface of the tube 1. In addition, when the tube 1 is reversely pulled after the end portion of the tube 1 is completely inserted into the connector body 110, the tube 1 may be fixed by the clamp while being locked by the hook of the clamp 130. Thus, the tube may be completely fixed in the connector body without being separated from the connector body. In particular, the O-ring 140 may be compressed between the outer circumferential surface of the tube 1 and the inner circumferential surface of the connector body 110 thereby maintaining sealing between the tube and the connector body.

Figure 7:
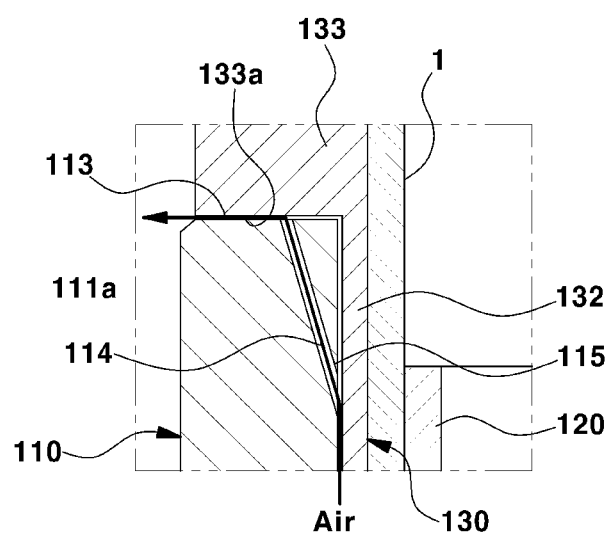
FIG. 7 is an enlarged sectional view showing the air vent aperture of the connector body of the connector for the pneumatic circuit according to the exemplary embodiment of the present invention.

Meanwhile, the connector 100 according to the exemplary embodiment of the present invention may include an air vent aperture 114 formed through the connector body from the inner circumferential surface to the outer circumferential surface of the connector body 110, as shown in FIGS. 5 to 7. The air vent aperture 114 may be formed between the inner circumferential surface 111a of the tube insertion part 111 of the connector body, which is an inside surface of the connector body 110, and the end surface 113 of the end portion of the connector body, which is an outside surface of the connector body.

The air vent aperture 114 may generate an alarm sound when air leaks from the inside of the connector 100 due to the tube 1 being inaccurately assembled. When the tube is inaccurately assembled, and the air that leaks from a gap between the tube 1 and the connector body 110 may pass through the connector and thus, the air may generate an edge tone alarm sound such as a whistling sound. In the exemplary embodiment of the present invention, a plurality of air vent apertures 114 may be formed through the connector body 110 and the plurality of air vent apertures 114 may be arranged at regular intervals along a circumferential direction of the connector body 110.

Referring to FIG. 5, when the plurality of air vent apertures 114 is formed through the end portion of the connector body 110, inlets 114a of the air vent apertures 114 may be arranged on the inner circumference surface of the connector body 110 that is the inner circumference surface 111a of the tube insertion part at regular intervals along the circumferential direction of the connector body. In addition, referring to FIGS. 5 and 6, outlets of the air vent holes 114 may be arranged on the end portion of the connector body 110 at regular intervals along the circumferential direction of the connector body.

In the connector body 110, as shown FIG. 7, at least some sections of each of the air vent apertures 114 from the inner surface of the connector body, especially, the inner circumference surface 111a of the tube insertion part 111, may be formed through the connector body in an inclined direction. Particularly, a sharp edge portion 115 may be formed at a location proximate to the inlet of the air vent aperture 114 as the air vent aperture may be is formed through the connector body 110 in the inclined direction.

FIG. 8 is a sectional perspective view showing an air path when the tube is incorrectly assembled in the connector 100 for the pneumatic circuit according to the exemplary embodiment of the present invention. As shown in FIG. 8, when the tube 1 is incorrectly assembled in the connector body 110, the air that leaks from the gap between the tube 1 and the connector body 110 may pass through the air vent aperture 114.

In particular, after the air leaks from the gap between the outer circumference surface of the tube 1 and the inner circumference surface of the connector body 110, the air vibrates while passing through the edge portion 115 disposed in the inlet of the air vent aperture 114, thus generating a whistling sound. After that, the air passing through the air vent aperture 114 of the connector body 110 flows out through a gap between the end surface of the end portion of the connector body and a flange surface 133a of the clamp 130.

When air leakage occurs due to inaccurate assembly of the tube in the connector of the present invention, the generation of the alarm sound such as the whistling sound as described above may be caused by a principle that the air vibrates while passing through the sharp edge portion to generate the edge tone. In other words, the air that leaks from the connector 100 according to the exemplary embodiment of the present invention vibrates while passing through the edge portion 115 that is a start portion of the air vent aperture 114, and generates the whistling sound of the edge tone. The whistling sound forms the alarm sound that warns of inaccurate assembly of the tube and the air leakage.

Eventually, when the tube 1 is in inaccurate assembly such that the tube is slightly out of a desired compression location and the tube is unable compress the O-ring 140, or the tube 1 or the connector 100 is in a malfunctioning state due to deterioration (e.g., aging of the sealing member), air finely leaks through the air vent aperture 114, the alarm sound may be generated as described above, and an operator may hear the alarm sound and check the connector where the air leakage occurs, thereby finding the leak location.

Figure 9:
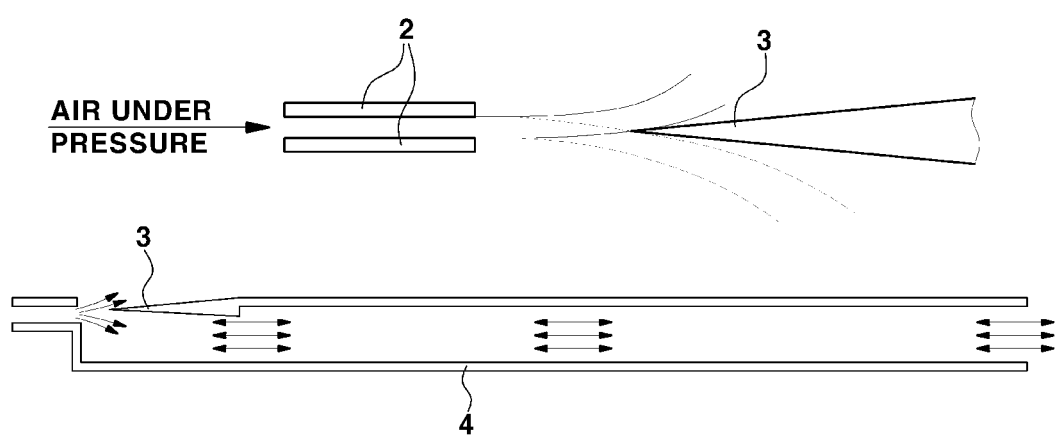
FIG. 9 is a view showing a principle of an edge tone alarm sound that is a sound generation principle of the connector for the pneumatic circuit according to the exemplary embodiment of the present invention.

FIG. 9 is a view showing the principle of edge tone that is a sound generation principle in the connector 100 for the pneumatic circuit according to the exemplary embodiment of the present invention. According to the edge tone phenomenon, when air under a pressure of a predetermined level or higher passes through a slit 2, which is a long and narrow passage, and hits an edge 3 disposed at a downstream side, the air flows in the form of vortex. When the vortex enters a tube 4, the air vibrates periodically while allowing the air inside the tube 4 to resonate, thereby generating a sound.

Pipe musical instruments such as a recorder, a flute, a dan-so (a Korean short bamboo flute), and a dae-guem (a Korean bamboo flute) or whistles are also made using the edge tone principle that generates a sound with resonance in the tube. In the flute, lips of a player serve as the slit. In the connector 100 of the present invention, when the air leaks from the gap between the tube 1 and the connector body 110, the fine gap and passage between the outer circumference surface of the tube 1 and the inner circumference surface of the connector body 110 serve as the slit 2 in FIG. 9, and the edge portion 115 formed at the starting portion of the air vent aperture 114 serves as the edge 3 in FIG. 9.

Accordingly, when the assembly state of the tube is inaccurate, or at least one of the tube 1 and the connector 100 is in a malfunctioned state due to deterioration (aging of the sealing member), the air that leaks from the gap inside the connector may pass through the air vent aperture 114 and may generate an alarm sound such as a whistling sound, and the operator may locate and repair the connector that generates the alarm sound more easily and rapidly among connectors inside the vehicle. As a result, when the connector according to the present invention is used, inaccurate assembly of the tube and the connector may be prevented, and maintenance time may be shortened.

In the above description, although the exemplary embodiment of the present invention has been described in detail, the scope of the present invention is not limited to the exemplary embodiment, and various modifications and changes using basic concept of the present invention defined in the accompanying claims by one of ordinary skill in the air to which this invention belongs is also included in the scope of the present invention.

What is claimed is:

1. A connector for a pneumatic circuit, comprising:
   a connector body in which an end portion of a tube is inserted;
   a sealing member disposed inside the connector body and maintaining sealing between the end portion of the tube and the connector body; and
   an air vent aperture bored through the connector body between an inner surface of the connector body and an outer surface of the connector body,
   wherein when air that leaks from a gap between the connector body and the end portion of the tube inserted into the connector body flows into the air vent aperture and passes through the aperture, an edge tone alarm sound is generated, and
   wherein the air vent aperture extends from the inner surface of the connector body to an upper end face of the connector body in an inclined direction.

2. The connector of claim 1, wherein the air vent aperture is formed between an inner circumferential surface defining a tube insert space that is an inside space of the connector body into which the end portion of the tube is inserted, the inner circumferential surface forms the inner surface of the connector body, and an end surface of an end portion of the connector body, the end surface forms the outer surface of the connector body.

3. The connector of claim 2, further comprising:
a clamp installed by being inserted into the connector body and fixing the end portion of the tube inserted into the connector body,
wherein the clamp has a flange part at an end portion thereof, the flange part extending radially outward and being disposed outside the connector body, and
a surface of the flange part faces the end surface of the end portion of the connector body.

4. The connector of claim 1, wherein the air vent aperture formed in the connector body is configured as a plurality of air vent apertures arranged at regular intervals along a circumferential direction of the connector body.

5. The connector of claim 4, wherein each of the plurality of air vent apertures has respective inlets and outlets.

6. The connector of claim 5, wherein the inlets are arranged on the inner surface of the connector body at regular intervals along the circumferential direction of the connector body, and the outlets are arranged on the outer surface of the connector body at regular intervals along the circumferential direction of the connector.

7. The connector of claim 4, wherein at least some sections of each of the plurality of air vent apertures from the inner surface of the connector body pass through the connector body in an inclined direction to form an edge portion on the connector body at a location proximate to an inlet of the air vent aperture.

8. The connector of claim 1, wherein at least some sections of the air vent aperture from the inner surface of the connector body pass through the connector body in an inclined direction to form an edge portion on the connector body at a location proximate to an inlet of the air vent aperture.

9. The connector of claim 1, further comprising:
a guide that guides the end portion of the tube inserted into the connector body; and
a clamp that fixes the end portion of the tube inserted into the connector body.

10. A connector for a pneumatic circuit, comprising:
a connector body in which an end portion of a tube is inserted;
a sealing member disposed inside the connector body and maintaining sealing between the end portion of the tube and the connector body;
an air vent aperture formed through the connector body from an inner surface of the connector body to an outer surface of the connector body;
a clamp installed by being inserted into the connector body and fixing the end portion of the tube inserted into the connector body;
wherein the clamp has a flange part at an end portion thereof, the flange part extending radially outward and being disposed outside the connector body; and
a surface of the flange part faces the end surface of the end portion of the connector body,
wherein when air that leaks from a gap between the connector body and the end portion of the tube inserted into the connector body flows into the air vent aperture and passes through the aperture, an edge tone alarm sound is generated, and
the air vent aperture is formed between an inner circumferential surface defining a tube insert space that is an inside space of the connector body into which the end portion of the tube is inserted, the inner circumferential surface forms the inner surface of the connector body, and an end surface of an end portion of the connector body, the end surface forms the outer surface of the connector body.

* * * * *